(12) United States Patent
Toda et al.

(10) Patent No.: US 11,119,065 B2
(45) Date of Patent: Sep. 14, 2021

(54) ELECTROMAGNETIC SENSOR

(71) Applicant: HORIBA Advanced Techno, Co., Ltd., Kyoto (JP)

(72) Inventors: Kensuke Toda, Kyoto (JP); Yuichi Ichinari, Kyoto (JP); Manabu Shibata, Kyoto (JP)

(73) Assignee: HORIBA ADVANCED TECHNO, CO., LTD., Kyoto (JP)

( * ) Notice: Subject to any disclaimer, the term of this patent is extended or adjusted under 35 U.S.C. 154(b) by 215 days.

(21) Appl. No.: 16/203,465

(22) Filed: Nov. 28, 2018

(65) Prior Publication Data

US 2019/0187083 A1 Jun. 20, 2019

(30) Foreign Application Priority Data

Dec. 15, 2017 (JP) ............................... JP2017-241193

(51) Int. Cl.
*G01N 27/07* (2006.01)
*G01N 27/30* (2006.01)
(Continued)

(52) U.S. Cl.
CPC ............. *G01N 27/07* (2013.01); *G01F 1/584* (2013.01); *G01N 27/30* (2013.01); *G01N 27/413* (2013.01);
(Continued)

(58) Field of Classification Search
CPC ...... G01N 27/07; G01N 27/30; G01N 27/413; G01N 27/414; G01N 27/4145;
(Continued)

(56) References Cited

U.S. PATENT DOCUMENTS

| 5,178,744 A | 1/1993 | Nakazawa et al. |
| 5,405,510 A * | 4/1995 | Betts .................. A61B 5/14539 |
| | | 204/403.02 |

(Continued)

FOREIGN PATENT DOCUMENTS

| JP | 2015135241 A | 7/2015 |
| JP | 2016-180601 A | 10/2016 |

OTHER PUBLICATIONS

Machine Translation of JP2016180601A published Oct. 13, 2016 (Year: 2016).*

(Continued)

*Primary Examiner* — Steven L Yeninas
(74) *Attorney, Agent, or Firm* — Alleman Hall Creasman & Tuttle LLP

(57) ABSTRACT

Provided is an electromagnetic sensor capable of stably measuring electric conductivity and the like even in the case where solid matters are mixed in a sample solution. The electromagnetic sensor includes a substrate, a through hole formed in the substrate, an electrode attached to a surface of the substrate, and a housing that covers the through hole and the electrode, and in this configuration, the sample solution supplied to a surface of the substrate opposite to the surface of the substrate having the electrode attached thereto is allowed to flow into the housing from the through hole and to be accommodated in the housing, so that the sample solution is allowed to be in contact with the electrode.

12 Claims, 9 Drawing Sheets

(51) Int. Cl.
*G01F 1/58* (2006.01)
*G01N 27/413* (2006.01)
*G01N 27/416* (2006.01)
*G01F 1/60* (2006.01)
*G01N 27/414* (2006.01)

(52) U.S. Cl.
CPC .......... *G01N 27/4163* (2013.01); *G01F 1/60* (2013.01); *G01N 27/414* (2013.01)

(58) Field of Classification Search
CPC .......... G01N 27/4146; G01N 27/4148; G01N 27/4163; G01N 27/54366; G01F 1/584; G01F 1/60
See application file for complete search history.

(56) References Cited

U.S. PATENT DOCUMENTS

| | | | |
|---|---|---|---|
| 5,833,824 A | 11/1998 | Benton | |
| 6,294,133 B1 | 9/2001 | Sawada et al. | |
| 2010/0033188 A1* | 2/2010 | Rieth | A61B 5/4294 |
| | | | 324/438 |
| 2013/0075254 A1* | 3/2013 | Johnson | G01N 27/4148 |
| | | | 204/406 |
| 2014/0131224 A1* | 5/2014 | Kroener | G01N 27/49 |
| | | | 205/789.5 |
| 2015/0107993 A1* | 4/2015 | Izquierdo | G01N 33/1866 |
| | | | 204/403.01 |
| 2016/0320326 A1* | 11/2016 | Zevenbergen | G01N 27/301 |
| 2019/0246959 A1* | 8/2019 | Ionescu | A61B 5/1477 |

OTHER PUBLICATIONS

Moser, N et al., "A robust ISFET Array with In-Pixel Quantisation and Automatic Offset Calibration," 2016 IEEE Biomedical Circuits and Systems Conference (BIOCAS), pp. 50-53, Oct. 1, 2016, 4 pages.

European Patent Office, Extended European Search Report Issued in Application No. 18 209 491.2, dated Mar. 11, 2019, Germany, 9 pages.

Futagawa, M. et al., "A Miniature Integrated Multimodal Sensor for Measuring pH, EC and Temperature for Precision Agriculture," Sensors, Jun. 15, 2012, 17 pages.

* cited by examiner

ELECTROMAGNETIC SENSOR

TECHNICAL FIELD

The present invention relates to an electromagnetic sensor for measuring electric conductivity, resistivity, dielectric constant, and the like of a sample solution.

BACKGROUND ART

In order to stably measure electric conductivity and the like, it is necessary to have a housing that accommodates a sample solution therein and covers a measurement electrode and controls a spread range of electric flux lines, magnetic flux lines and the like.

Therefore, for example, as shown in Patent Document 1, a conventional electric conductivity sensor is provided with a housing that controls the spread range of the electric flux lines so as to cover the electrodes mounted on a substrate, and the sample solution is allowed to flow through a flow path formed inside the housing to thereby measure the electric conductivity and the like.

However, in such a conventional electric conductivity sensor, since the electrodes are directly exposed to the flow of the sample solution generated inside the housing, there may be a risk of breakage due to the electrodes being in contact with solid matters in the case where the solid matters are mixed into the sample solution.

CITATION LIST

Patent Literature

Patent Literature 1: Japanese Unexamined Patent Application Publication No. 2015-135241

SUMMARY OF INVENTION

Technical Problem

The present invention has been made in consideration of the problem mentioned above, and a main object thereof is to provide an electromagnetic sensor capable of stably measuring electric conductivity, resistivity, dielectric constant, or the like even in the case where solid matters are mixed in a sample solution.

Solution to Problem

That is, an electromagnetic sensor according to the present invention includes: a substrate; a through hole formed in the substrate; an electrode attached to a surface of the substrate; and a housing covering the through hole and the electrode, and in this configuration, a sample solution supplied to a surface of the substrate opposite to the surface of the substrate having the electrode attached thereto is allowed to flow into the housing from the through hole and to be accommodated in the housing, so that the sample solution is allowed to be in contact with the electrode.

According to this electromagnetic sensor, since the sample solution supplied to the surface of the substrate opposite to the surface of the substrate having the electrode attached thereto is allowed to flow into the housing from the through hole and to be accommodated in the housing and the sample solution is in contact with the electrode, the electrode is not easily exposed directly to the flow of the sample solution.

Therefore, even in the case where solid matters are contained in the sample solution, it is possible to reduce the possibility of breakage of the electrode and the electric conductivity and the like can be stably measured.

Meanwhile, in a conventional multi-sensor unit 1 as shown in FIG. 9, a plurality of types of sensors such as an electromagnetic sensor 123 are mounted on a sheet-like substrate 11 on which electrodes are printed and a small amount of sample solution S is in contact with the substrate 11 to thereby measure electric conductivity and the like. In this conventional configuration, a housing 125 is attached to the substrate 11 so as to cover, for example, the electrodes 1232 for measuring the electric conductivity provided on the substrate 11 such that the housing 125 protrudes to the side of the sample solution S being supplied on the substrate 11, and through holes are formed in this housing 125.

Moreover, as one of the plurality of types of the sensors, for example, in the case where an ion selective electrode 121 or the like is attached to a surface of the substrate 11, in particular, an ISFET electrode 121P is attached to the substrate 11 so as to protrude to the opposite side to the surface of the substrate 11 which is in contact with the sample solution S.

Therefore, in this conventional multi-sensor unit 1, as shown in FIG. 9, in the case of measuring the electric conductivity and the like of the sample solution S, it is necessary to fill at least a region up to a height of the housing 125 from the surface of the substrate 11 with the sample solution S.

Moreover, since it is necessary to spread the sample solution to a certain range of an area in order that the plurality of types of sensors are in contact with the sample solution S, there is a problem that it is difficult to reduce the amount of the sample solution S necessary for measurement.

Further, since the electric conductivity sensor 123 and the ISFET electrode 121P are protruded in the opposite directions, respectively, across the substrate 11, there is also a problem that it is difficult to reduce a thickness of the multi-sensor unit 1.

Therefore, in the present invention, such a multi-sensor unit is configured to include a substrate and a plurality of types of sensors attached to the substrate, and an electromagnetic sensor which is one of the sensors includes: a through hole formed in the substrate; an electrode attached to a surface of the substrate; and a housing covering the electrode and the through hole, so that a sample solution supplied to a surface of the substrate opposite to the surface of the substrate having the electrode attached thereto is allowed to flow into the hosing from the through hole and to be accommodated in the housing, so that the sample solution is allowed to be in contact with the electrode.

According to this multi-sensor unit, since the housing of the electromagnetic sensor is disposed on a surface of the substrate opposite to the surface of the substrate to which the sample solution is supplied, it becomes possible to reduce a protruded part protruding toward the sample solution supply side from the substrate.

As a result, since it is possible to reduce an amount of the sample solution per an area supplied to the surface of the substrate, the amount of the sample solution required for measurement can be reduced as compared to the conventional one.

Further, in the present invention, for example, in the case where the ISFET electrode and the like are attached to the substrate so as to protrude to the side opposite to the surface of the substrate to which the sample solution is supplied as in the conventional one, since the electromagnetic sensor and the ISFET electrode and the like can be protruded in the same direction with respect to the substrate, the thickness of the multi-sensor unit can be made thinner than the conventional one.

According to the multi-sensor unit as described above, since it is possible to reduce an amount of the sample solution per an area supplied to the multi-sensor unit, the number of sensors measurable at the same time using the same amount of the sample solution can be increased as compared to the conventional one.

By the way, in a multi-sensor unit provided with a plurality of sensors, there may be a case where sensors of which output values are shifted earlier than a calibration time assumed beforehand at the time of designing may be mixed.

In such a case, since it is conventionally necessary to decide the calibration time in accordance with the sensor of which the output value is shifted earliest, there is a problem that the whole of the plurality of sensors should be frequently calibrated.

Therefore, in the case of using the multi-sensor unit provided with three or more sensors of the same type, by automatically calibrating an output value of each of sensors so as to be equal to an average value of output values of the plurality of sensors in the case where an absolute value difference between an average value of the output values of the plurality of sensors and the output value of each of the sensors exceeds a predetermined threshold value, it is not necessary to calibrate the whole of the plurality of sensors up to the calibration time assumed beforehand at the time of designing the plurality of sensors even in the case where sensors of which output values are shifted earlier than the calibration time assumed beforehand at the time of designing are mixed.

Therefore, it is possible to reduce labor and cost required for the calibration of the multi-sensor unit.

Further, for example, in the case of measuring sample solution of particularly low concentration, using the multi-sensor unit provided with the plurality of the same type of sensors as described above, according to an electrochemical measurement method of performing a calculation based on the output values of the plurality of sensors and calculating a measurement value excluding a noise, it is possible to improve measurement accuracy of an electrochemical measurement apparatus provided with the multi-sensor unit even in the case of measuring the sample solution of a low concentration.

Advantageous Effects of Invention

According to the present invention, since the sample solution supplied to a surface of the substrate opposite to the surface of the substrate having the electrode attached thereto is allowed to flow into the housing from the through hole and to be accommodated therein and the sample solution is in contact with the electrode, the electrode is not easily exposed directly to the flow of the sample solution.

Therefore, even in the case where solid matters are contained in the sample solution, it is possible to reduce the possibility of breakage of the electrode and the electric conductivity and the like of a wide range of the sample solution can be stably measured without taking time and labor for such as removing the solid matters in the sample solution.

DESCRIPTION OF EMBODIMENTS

An embodiment of the present invention will be described below with reference to the accompanying drawings.

A multi-sensor unit 1 according to the present embodiment is used in an electrochemical measurement apparatus 100 such as a multi-ion sensor for measuring electrochemical properties of a sample solution S, for example, electric conductivity, resistivity, dielectric constant, various ion concentrations, and oxidation-reduction potential thereof.

Figure 1:
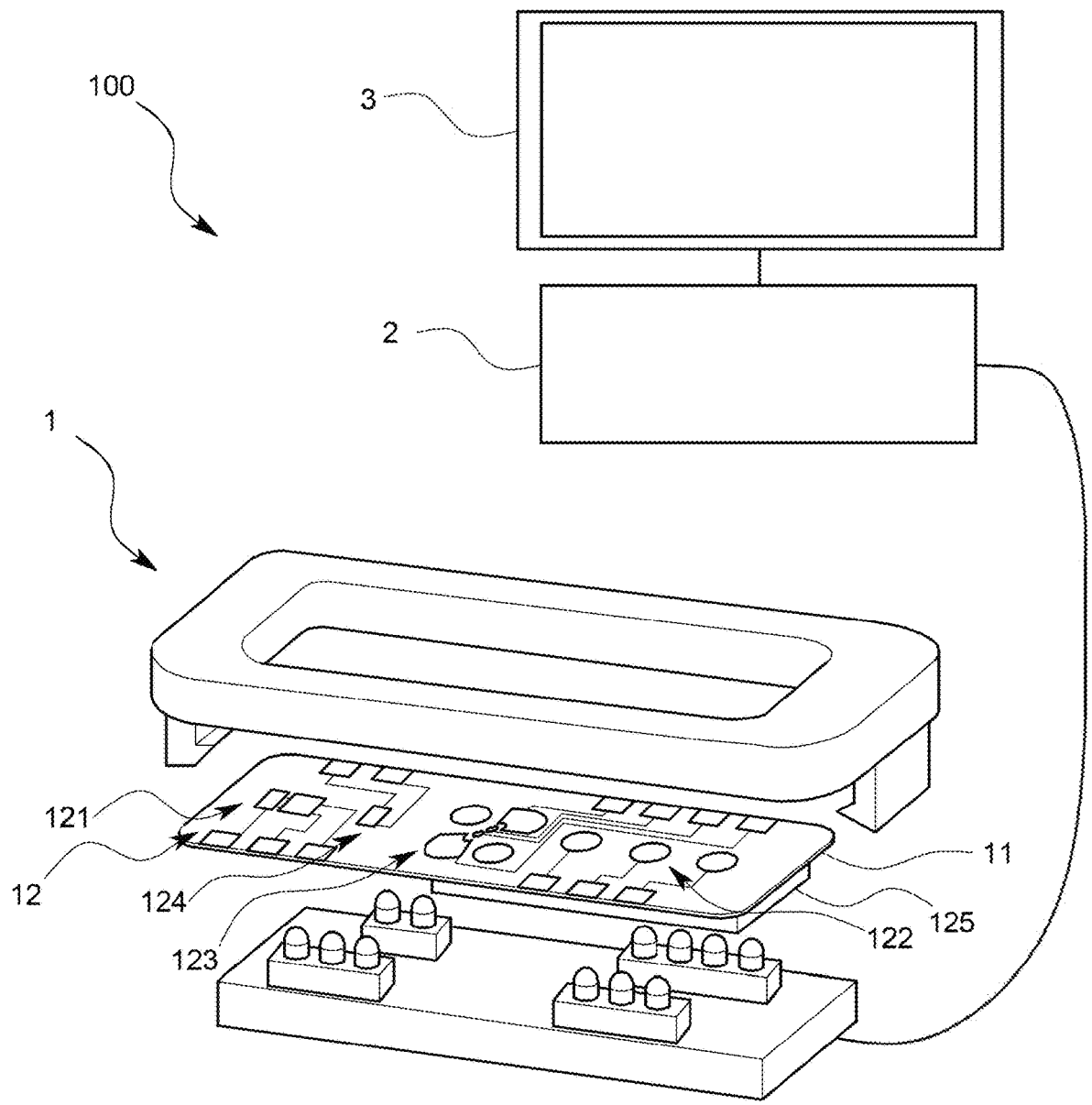
FIG. 1 is a schematic diagram showing an entire electrochemical measurement apparatus according to one embodiment of the present invention.

For example, as shown in FIG. 1, the electrochemical measurement apparatus 100 includes: a multi-sensor unit 1 provided with a plurality types of sensors; an information processing unit 2 for calculating such as measurement values based on output signals of the sensors; and a display part 3 for displaying the measurement values calculated by the information processing unit 2.

For example, as shown in FIG. 1, the multi-sensor unit 1 includes: a sheet-like substrate 11 having a length of about 3 cm, a width of about 1 cm, and a thickness of about 0.5 mm which is made of such as liquid crystal polymer, polyvinyl chloride, or polyethylene terephthalate; and a sensor part 12 provided on the substrate 11.

The information processing unit 2 includes: a digital circuit including a CPU, a memory, a communication port, and the like; an analog circuit including a buffer, amplifier, and the like, and an AD converter, a DA converter, and the like that mediate between a digital circuit and an analog circuit. Thus, the CPU and peripheral devices thereof cooperate in accordance with a predetermined program stored in the memory, thereby functioning as a calculation part and the like for calculating a measurement value based on an output value outputted from the multi-sensor unit 1.

The sensor part 12 is described in detail as follows.

Figure 2A:
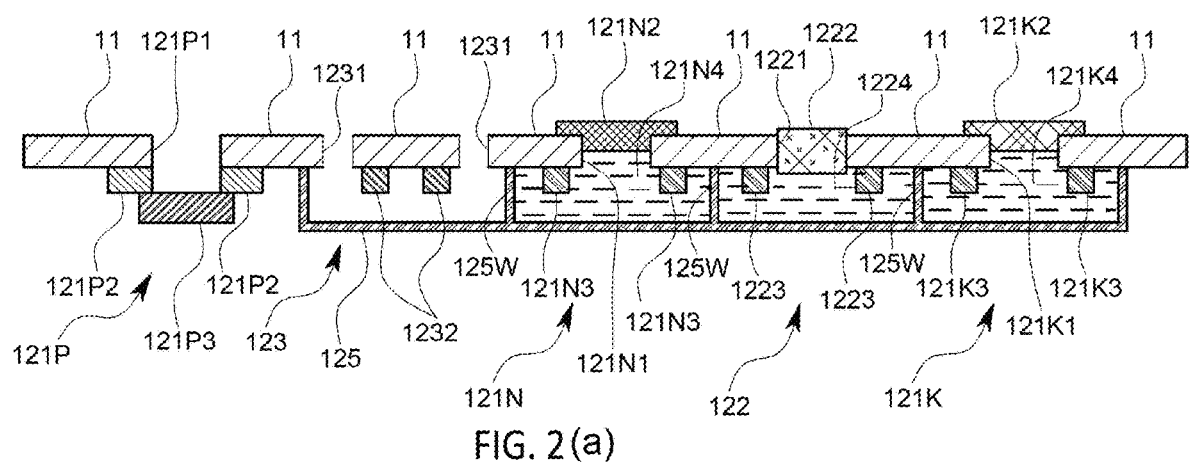
FIGS. 2(a) and 2(b) are schematic diagrams showing an entire multi-sensor unit and an end surface thereof according to the present embodiment.
Figure 2B:
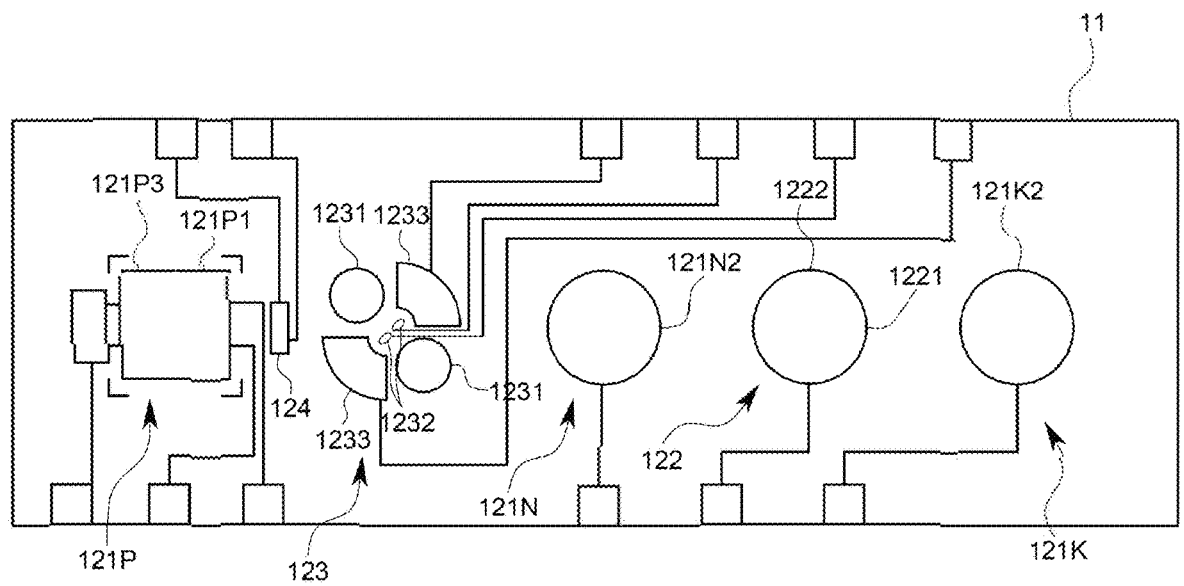

For example, as shown in FIGS. 2(a) and 2(b), the sensor part 12 includes: an ion selective electrode 121; a comparison electrode 122; an electromagnetic sensor 123; and a thermistor 124 and the like, which are respectively connected to the information processing unit 2 by a printed wiring formed on the substrate 11.

In the present embodiment, the ion selective electrode 121 includes: for example, a pH electrode 121P for measuring a hydrogen ion concentration in the sample solution S; a sodium ion selective electrode 121N for measuring a sodium ion concentration; and a potassium ion selective electrode 121K for measuring a potassium ion concentration.

The pH electrode 121P is an ISFET electrode 121P which includes: a pH electrode dedicated through hole 121P1 formed in the substrate 11; two ISFET electrode connecting members 121P2 such as solder bumps printed on a surface of the substrate 11 opposite to the surface of the substrate 11 to be in contact with the sample solution S; and an ISFET chip 121P3 electrically connected, by means of so-called flip chip mounting, to the printed wiring printed on the substrate 11 by the two ISFET electrode connecting members 121P2.

The ISFET chip 121P3 is attached so as to protrude to a surface of the substrate 11 opposite to the surface of the substrate 11 to which the sample solution S is supplied in a manner such that a sensitive surface thereof is to be in contact with the sample solution S via the pH electrode dedicated through hole 121P1.

As an example of the ISFET chip 121P3, there may be listed a $TaO_5$ film stacked on a gate insulating film to form the sensitive surface.

The sodium ion selective electrode 121N includes: a sodium ion selective electrode dedicated through hole 121N1 formed in the substrate 11; an ion sensitive film 121N2 attached to the substrate 11 so as to close the sodium ion selective electrode dedicated through hole 121N1; internal electrodes 121N3 including such as a silver/silver chloride electrode attached to a surface of the substrate 11 opposite to the surface of the substrate 11 to which the sample solution S is supplied; a housing 125 attached to the substrate 11 so as to cover the internal electrodes 121N3; and internal liquid 121N4 such as an aqueous solution of NaCl accommodated in the housing 125.

As an example of the ion sensitive film 121N2, there may be listed a PVC film, a liquid film or a solid film containing an ionophore, and a solid film containing ions to be measured.

The potassium ion selective electrode 121K includes: a potassium ion selective electrode dedicated through hole 121K1 formed in the substrate 11; an ion sensitive film 121K2 attached to the substrate 11 so as to close the potassium ion selective electrode dedicated through hole 121K1; internal electrodes 121K3 including such as silver/silver chloride electrodes attached to a surface of the substrate 11 opposite to the surface of the substrate 11 to which the sample solution S is supplied; the housing 125 attached to the substrate 11 so as to cover the internal electrodes 121K3; and internal liquid 121K4 such as an aqueous solution containing $CaCl_2$) and KCl accommodated in the housing 125.

As an example of the ion sensitive film 121K2, there may be listed a PVC film, a liquid film or a solid film containing an ionophore, and a solid film containing ions to be measured.

The comparison electrode 122 functions as a reference electrode of the ion selective electrode 121 and the comparison electrode 122 includes: a comparison electrode dedicated through hole 1221 formed in the substrate 11; a liquid junction part 1222 including a ceramic or the like material provided so as to close the comparison electrode dedicated through hole 1221; internal electrodes 1223 including such as silver/silver chloride electrodes attached to a surface of the substrate 11 opposite to the surface of the substrate 11 to which the sample solution S is supplied; the housing 125 attached to the substrate 11 so as to cover the internal electrodes 1223 and the comparison electrode dedicated through hole; and internal liquid 1224 such as an aqueous solution of 3.3 mol/L KCl accommodated in the housing 125.

Thus, in the present embodiment, the electromagnetic sensor 123 has specific features as following.

The electromagnetic sensor 123 is adapted to measure electric conductivity, resistivity, dielectric constant, and the like of the sample solution S by using electric flux lines or magnetic flux lines, and in the present embodiment, this sensor is, for example, an electric conductivity sensor 123 for measuring electric conductivity of the sample solution S.

The electric conductivity sensor 123 includes: two electric conductivity sensor dedicated through holes 1231 formed in the substrate 11; two measurement electrodes (voltage electrodes) 1232 printed at positions sandwiched between two electric conductivity sensor dedicated through holes 1231 on a surface of the substrate 11 opposite to the surface of the substrate 11 to which the sample solution S is supplied; two current electrodes 1233 printed so as to surround these two measurement electrodes 1232; and the housing 125 attached to the substrate 11.

The housing 125 has a quadrangular cup-like shape attached to the substrate 11 so as to cover the measurement electrodes 1232 and the current electrodes 1233 for generating electric flux lines from a surface of the substrate 11 opposite to the surface of the substrate 11 to which the sample solution S is supplied, and the sample solution S is accommodated in an interior space of the housing 125 to control a spread of the electric flux lines.

In the present embodiment, this housing 125 is formed integrally with the housings 125 for covering the sodium ion selective electrode 121N and the potassium ion selective electrode 121K, the comparison electrode 122 and the like, and it is formed of, for example, polyethylene terephthalate or polypropylene.

In the interior of the housing 125, there are provided partition walls 125W for liquid-tightly partitioning a space for accommodating each internal liquid and the sample solution S, in order for preventing the internal liquid of each electrode and the sample solution S from being mixed with each other.

The housing 125 may have such a size that an appropriate amount of the sample solution S can be accommodated therein in order for controlling a spread range of the electric flux lines between the measurement electrodes 1232 of the electric conductivity sensor 123, in the present embodiment, the housing 125 is configured to have a size to protrude, for example, about 2 mm from a surface of the substrate 11 opposite to the surface of the substrate 11 with which the sample solution S is to be in contact.

According to the multi-sensor unit 1 provided with the electric conductivity sensor 123 configured as described above, the following effects can be obtained.

The sample solution S supplied to a surface of the substrate 11 opposite to the surface of the substrate 11 to which the measurement electrodes 1232 and the current electrodes 1233 are attached, is allowed to flow into the housing 125 from the through holes 1231 and to be accommodated therein. Therefore, since the sample solution S is in contact with the measurement electrodes 1232 and the current electrodes 1233, these measurement electrodes 1232 and current electrodes 1233 are not easily exposed directly to the flow of the sample solution S.

Therefore, even in the case where solid matters are contained in the sample solution S, it is possible to reduce the possibility that the measurement electrodes 1232 and the current electrodes 1233 are damaged, so that it is possible to stably measure the electric conductivity of the sample solution S in a wide range without taking time and labor for such as removing the solid matters in the sample solution S.

Further, since the housing 125 for the electric conductivity sensor 123 is disposed on a surface of the substrate 11 opposite to the surface of the substrate 11 to which the sample solution S is supplied, it becomes possible to reduce a part protruding from the substrate 11 toward the side to which the sample solution S is supplied.

Figure 3:
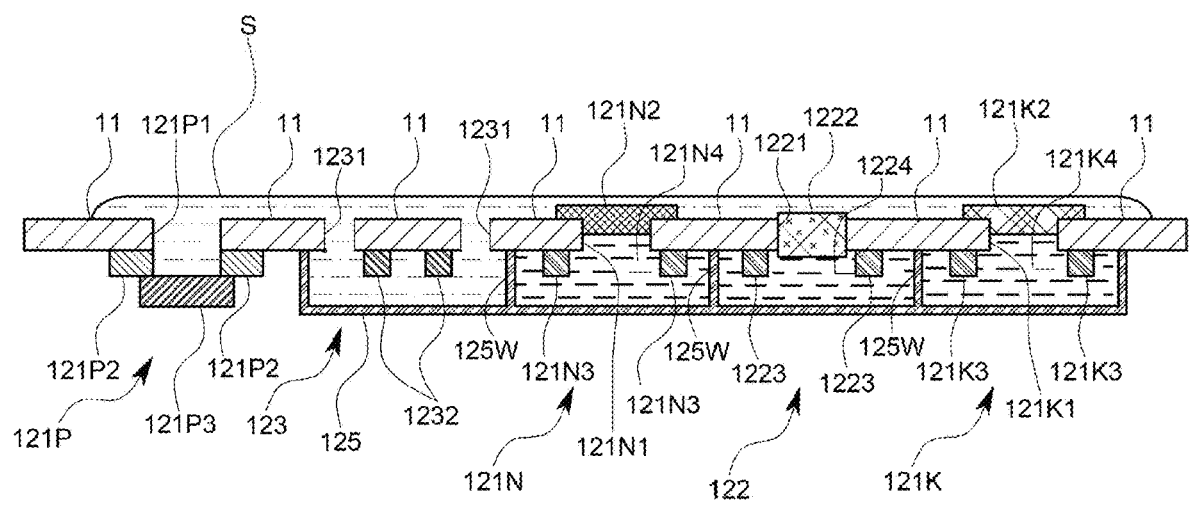
FIG. 3 is a schematic diagram showing a relationship between the multi-sensor unit and a sample solution according to the present embodiment.

As a result, as shown in FIG. 3, since it is possible to reduce an amount of the sample solution S per an area supplied to the surface in the side of the sample solution S of the substrate 11, the amount of the sample solution S required for measurement can be reduced as compared to the conventional one.

Further, since it is possible to reduce the amount of the sample solution S per an area supplied for measurement, the number of the sensors measurable at the same time using the same amount of the sample solution S can be increased as compared to the conventional one.

Since the two electric conductivity sensor dedicated through holes 1231 are formed, for example, in the case where the sample solution S enters into the housing 125 from one of the through holes, air escapes from the other through holes, and therefore, the sample solution S supplied to the surface of the substrate 11 can be easily taken into the housing 125.

Since the electric conductivity sensor 123 is a four-electrode type having four electrodes, it is possible to further improve measurement accuracy of electric conductivity.

Further, since the housing 125 for the electric conductivity sensor 123, the housing 125 for each of the ion selective electrode 121 and the comparison electrode 122, or the ISFET chip 121P3 of the ISFET electrode 121P are attached to the substrate 11 so as to be protruded in the same direction with respect to the substrate 11, the thickness of the multi-sensor unit 1 can be made thinner than that of the conventional one.

In the ISFET electrode 121P, it is necessary that the ISFET connecting members 121P2 should be attached so as to be in contact with a sensitive surface where the ISFET chip 121P3 of the ISFET electrode 121P is to be in contact with the sample solution S.

Therefore, if the ISFET chip 121P3 of the ISFET electrode 121P is attached so as to protrude toward the side of the substrate 11 to which the sample solution S is supplied, wire bonding is necessary in order to connect the ISFET connecting member 121P2 with the substrate 11.

If the wire bonding is exposed to the outside, there is a possibility that the wire is broken due to external shock or deterioration.

Therefore, it is necessary to further attach a protection member made of resin or the like for covering and protecting the wire, and the thickness of the multi-sensor unit inevitably becomes large.

Moreover, since it takes time and labor for manufacturing, there is also a problem that a manufacturing cost of the multi-sensor unit 1 increases.

In the multi-sensor unit 1 according to the present embodiment, since the ISFET chip 121P3 is attached to the substrate 11 by flip-chip mounting, the manufacturing of the multi-sensor unit 1 can be more simplified and the thickness thereof can be made thinner than those in the case where the ISFET chip 121P3 is attached to the substrate 11 by wire bonding.

Since the housing 125 is formed of a highly flexible material such as polyethylene terephthalate, polypropylene, and polyvinyl chloride and since the thickness of the housing 125 is in a small degree of 2 mm, the multi-sensor unit 1 itself can be made more flexible so as to cope with bending, twisting, and the like than that of conventional one.

Further, since the substrate 11 is formed of a thin sheet-shaped liquid crystal polymer, polyvinyl chloride, polypropylene, polyethylene terephthalate, or the like, the multi-sensor unit 1 can be made more flexible so as to flexibly cope with bending, twisting, and the like.

By applying this technique, the multi-sensor unit 1 can be made wearable, worn on human skin surface, and it is possible to measure electrochemical properties of a minute amount of sample solution such as sweat.

According to the multi-sensor unit 1 as described above, the electrodes for the electric conductivity sensor 123, the electrodes of other sensors, the connecting members, and the like can be all printed on the same side of the substrate 11, it is possible to save labor and cost for printing the electrodes, the connecting members, and the like on both surfaces of the substrate 11 as in the conventional one.

Next, a modified example of the multi-sensor unit 1 will be described.

Although the two electric conductivity sensor dedicated through holes 1231 of the same size are formed, two through holes of different sizes may be formed, and two or more such as three or four through holes may be also formed.

It is sufficient so long as the sample solution S flowing into the housing 125 from the through holes 1231 and accommodated therein is merely in contact with the measurement electrodes 1232, and it is not important but optional as to whether the sample solution S is in contact with the surface of the substrate 11 to which the measurement electrodes 1232 are attached.

Further, the electric conductivity sensor 123 is not limited to be of four-electrode typed one but may be of two-electrode typed one.

The housing 125 is not limited to being formed integrally with the housings 125 for other sensors but may be formed independently as the housing 125 dedicated to the electric conductivity sensor 123.

The size of the housing 125 is not limited to that described above, and the thickness thereof may be made smaller or larger.

The shape of the housing 125 is not limited to a quadrangular cup-like shape, but may be a cylindrical shape, a polygonal column shape, a deformed column shape, or the like in which a space is formed toward the inside from an end surface which is in contact with the substrate 11, and also it is not limited to column one, but may be hemispherical, semielliptical, conical, polygonal pyramidal shapes, and the like.

Figure 4A:
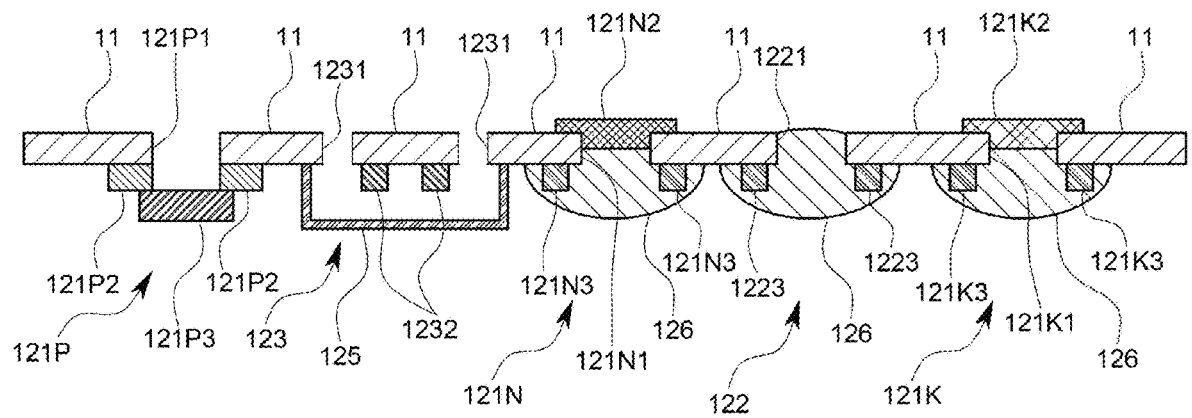
FIGS. 4(a) and 4(b) are schematic diagrams showing an entire multi-sensor unit and an end surface thereof according to another embodiment.
Figure 4B:
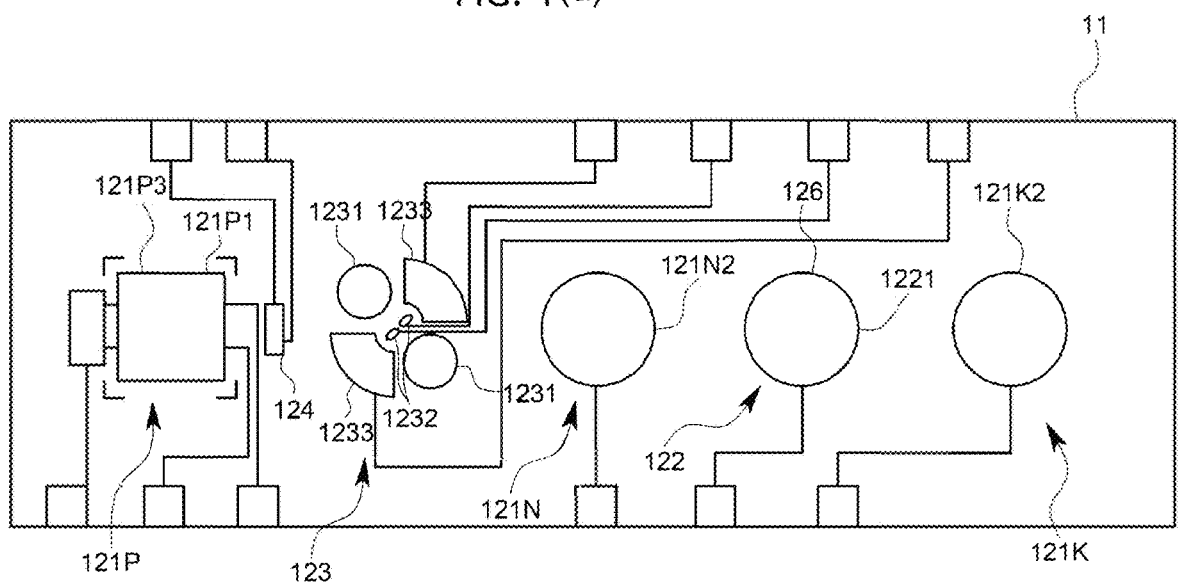

Further, as shown in FIGS. 4(a) and 4(b), regarding the ion selective electrode 121 and the comparison electrode 122, there may be used, for example, an ionic liquid-containing polymer 126 without using the internal liquid.

With this configuration, since it is not necessary to consider leakage or evaporation of the internal liquid from the housing 125, the multi-sensor unit 1 can be made more flexible.

Figure 5:
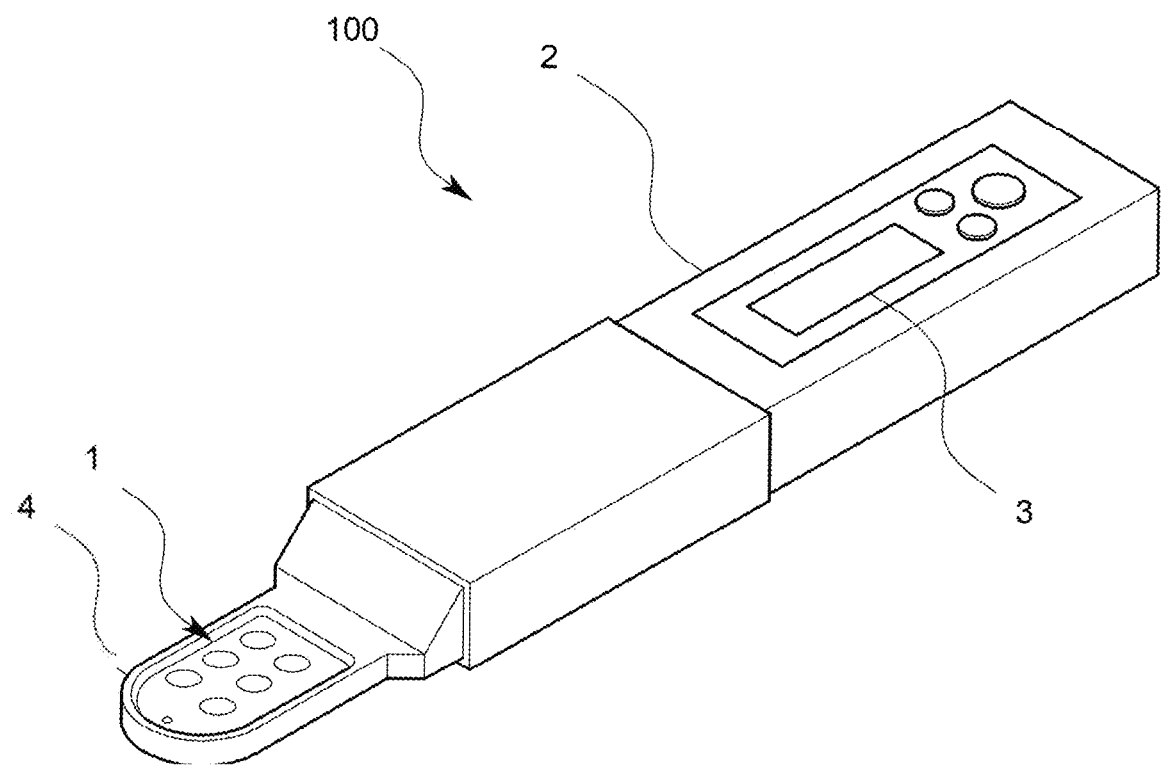
FIG. 5 is a schematic diagram showing an entire electrochemical measurement apparatus according to another embodiment.

As shown in FIG. 5, the electrochemical measurement apparatus 100 may be integrally provided with the multi-sensor unit 1, a sample holding part arranged so as to surround the multi-sensor unit 1 and holding the sample solution S, the information processing unit, a display part and the like, and it may be a device of a portable size.

Further, the electrochemical measurement apparatus 100 is not limited to an apparatus provided with the display part 3, and it may be also configured such that, a measurement value and the like calculated by the information processing unit 2 is transmitted wirelessly or by wire to an external device such as a personal computer, a tablet, a smartphone, and the other portable devices and to be displayed on a display included in the external device.

Further, it is also possible that the external device is allowed to have a function of the information processing unit 2. In this case, it may be configured such that, by installing a predetermined application to the external device, the output signal from the multi-sensor unit 1 is received wirelessly or by wire, and the received output signal is converted to desired information such as a measurement value and displayed on a display included in the external device. This predetermined application may be provided to an user as a program, and this program may be provided in a state of being recorded in a recording medium such as an optical disk and a semiconductor memory, or may be downloaded via a network to be provided.

The sensor part 12 of the multi-sensor unit 1 is not limited to the electromagnetic sensor 123, the pH electrode 121P, the sodium ion selective electrode 121N, and the potassium ion selective electrode 121K, but it may be an ion selective electrode for detecting nitrate ions, ammonium ions, fluorine ions, and the like and the other electrochemical sensors.

As a film forming the sensitive surface of the ISFET chip 121P3, there may be listed, for example, a liquid film or a solid film including a silicon nitride film ($Si_2N_3$ film), an alumina film ($Al_2O_3$ film), a PVC film, and an ionophore, and a solid film including ions to be measured, in addition to a $TaO_5$ film.

Although the multi-sensor unit 1 includes a plurality types of sensors, it may also include, for example, 100 or 1000 units of the same type of the sensors.

As an example of this unit 1, the following describes the electrochemical measurement apparatus 100 provided with the multi-sensor unit 1 including 80 pieces of pH electrodes 121P.

The electrochemical measurement apparatus 100 may further include calibration part.

Regarding the calibration part, the information processing unit 2 plays the role thereof, and for example, as to the pH electrode 121P, the calibration part automatically calibrates the pH electrode 121P for a period until a calibration period assumed at the time of designing.

The procedure of this automatic calibration is as follows.

Figure 6:
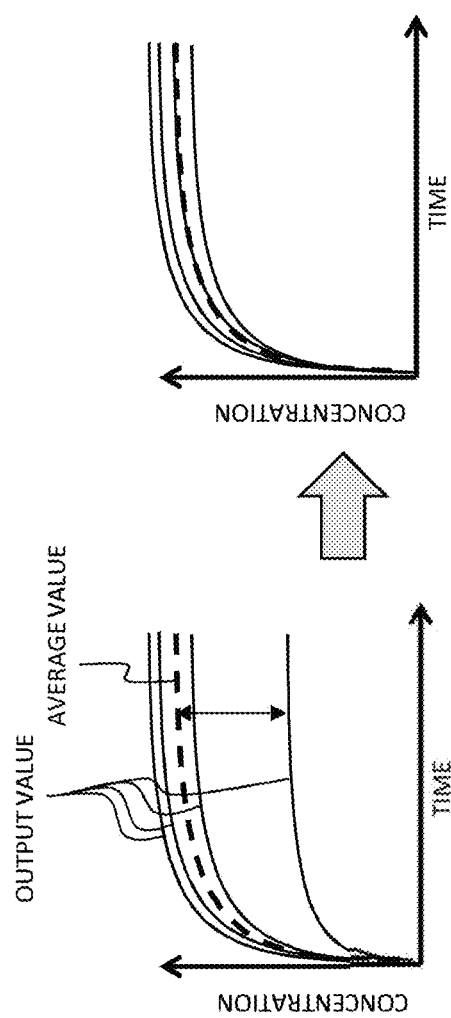
FIG. 6 is an explanatory diagram of calibration of a multi-sensor unit according to another embodiment.

As shown in FIG. 6, firstly, the calculation part calculates an average value of the output values outputted from the 80 pieces of pH electrodes 121P, respectively.

The calibration part compares the average value with each of the output values of the respective pH electrodes 121P, in the case where an absolute value difference between the average value and each of the output values exceeds a predetermined threshold value, the calibration part calibrates the output values of the above pH electrodes 121P so as to be equal to the average value of the output values of the 80 pieces of pH electrodes 121P or to be equal to an average value of the output values of the remaining pH electrodes 121P excluding the pH electrodes 121P each of which the output value exceeds the threshold value.

In this electrochemical measurement apparatus 100, since it is conventionally necessary to adjust the calibration timing to that of which the output value is shifted earliest among these numerous pH electrodes 121P, calibration works must be performed frequently, and it takes a lot of time and labor for calibration works.

Meanwhile, according to the calibration method according to the present embodiment, even in the case where a pH electrode 121P of which output value is shifted earlier than the calibration period assumed at the time of designing, is mixed among the numerous pH electrodes 121P provided in the multi-sensor unit 1, it is not necessary to set the timing for calibrating all of the numerous pH electrodes 121P earlier. Therefore, the frequency of calibrating all of the numerous pH electrodes 121P can be reduced lower than in the conventional one.

This calibration method can be applied not only to an electromechanical apparatus 100 provided with the multi-sensor unit 1 having, e.g., 80, 100, 1000 pieces of pH electrodes 121P as described above, but also applied to various electrochemical measurement apparatuses 100 provided with the multi-sensor unit 1 having three or more pH electrodes 121P.

The sensor which can be automatically calibrated is not limited to the pH electrode 121P, and any sensor that requires calibration at regular intervals may be automatically calibrated.

As further another embodiment of the electrochemical measurement apparatus 100 according the present invention, there may be listed one that the calculation part calculates the measurement value after removing a noise based on output values of the plurality of sensors of the same type provided in the multi-sensor unit 1.

Figure 7:
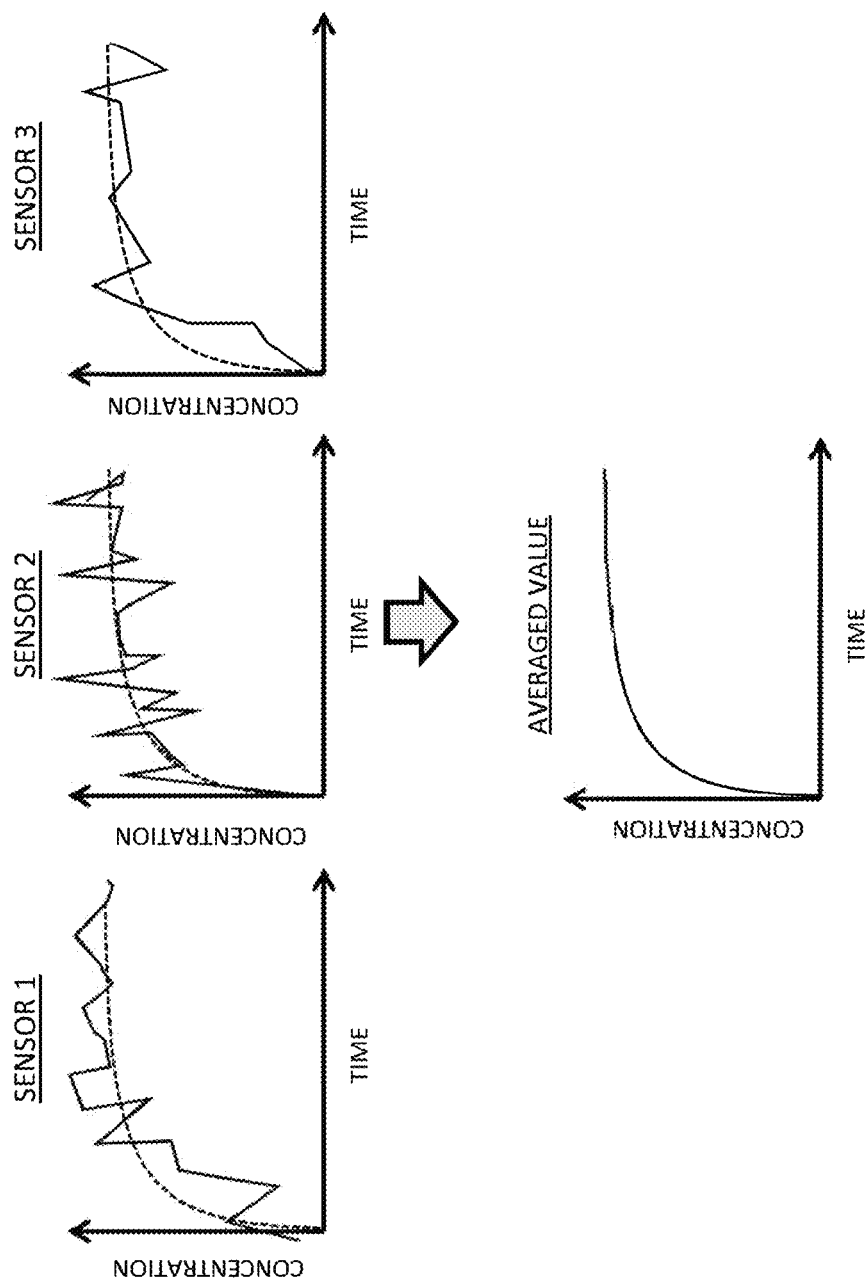
FIG. 7 is an explanatory diagram of calculation of a measurement value of a multi-sensor unit according to another embodiment.

In the present embodiment, for example, as shown in FIG. 7, the calculation part is configured to calculate an average value of output values of the 80 pieces of pH electrodes 121P provided in the multi-sensor unit 1 and the calculated value is outputted as a measurement value.

In particular, in the conventional ion selective electrode 121 of pH electrode 121P and the like, in the case where the ion concentration in the sample solution S is low, there is a problem that an influence of the noise included in the output values of the pH electrodes 121P becomes large.

In this regard, according to a measurement value calculation method according to the present embodiment, even in the case where ion concentration of the sample solution S having low concentration, the influence of the noise can be suppressed and measurement accuracy can be improved.

Figure 8:
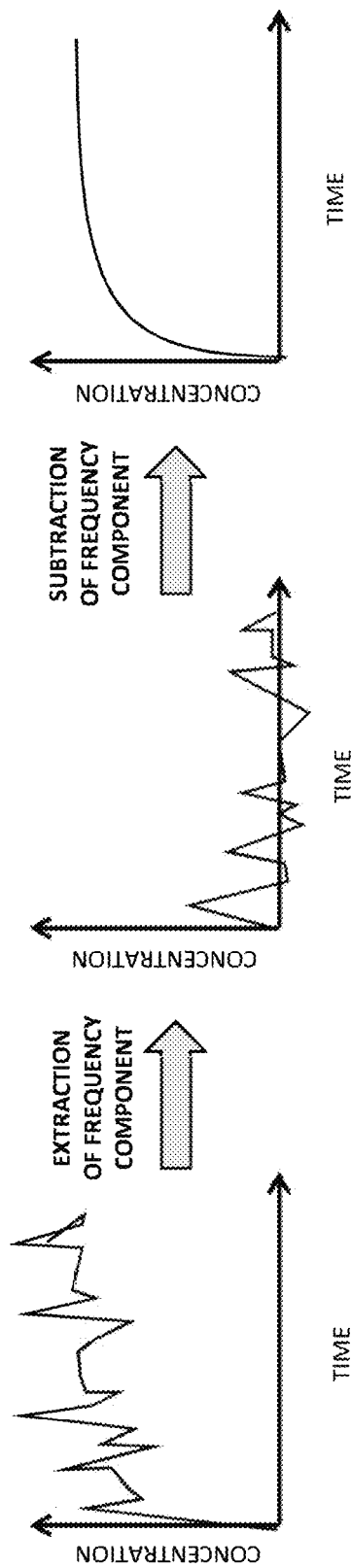
FIG. 8 is an explanatory diagram of calculation of a measurement value of a multi-sensor unit according to another embodiment.
Figure 9:
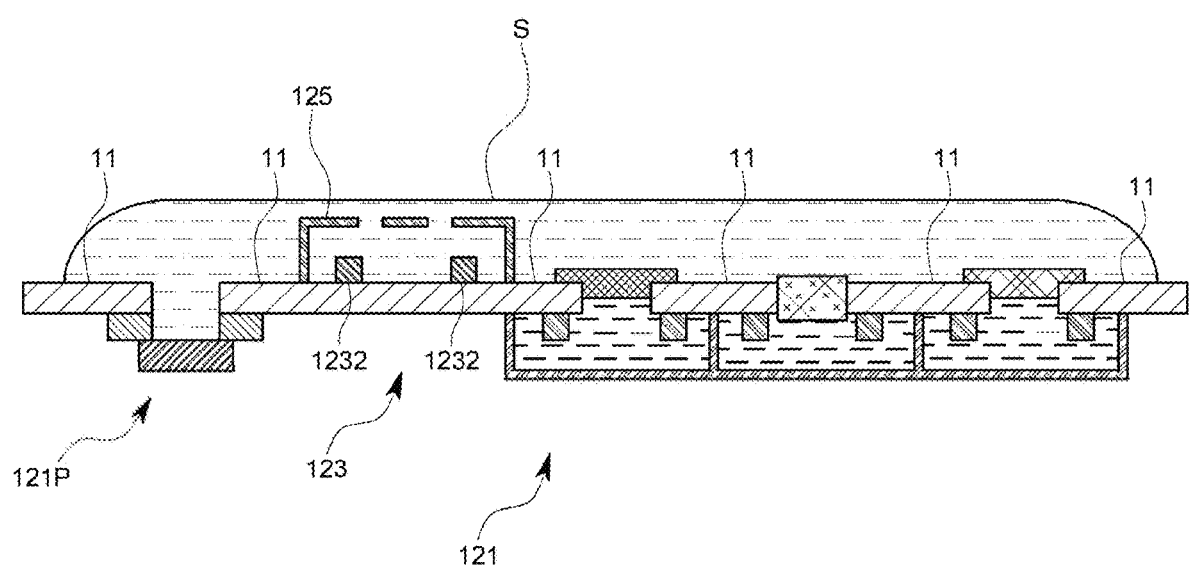
FIG. 9 is a schematic diagram showing a relationship between a conventional multi-sensor unit and a sample solution.

The calculation part may be configured to extract only a frequency common to the output values of the plurality of pH electrodes 121P using the Fourier transform or the like, for example, as shown in FIG. 8, in accordance with intended use or measurement environment of the electrochemical measurement apparatus 100, other than calculating the average value of the output values as described above. Also, it may be configured to exclude only the frequency common to the output values of the plurality of pH electrodes 121P.

For example, in the case where the frequency to be extracted is known, if the common frequency can be extracted from the output values of the plurality of pH electrodes 121P, the measurement accuracy can be improved more efficiently.

Further, in the case where a common noise is generated due to, for example, use environment, it may be effective in some cases to remove the frequency of the noise common to the output values of the plurality of pH electrodes 121P.

This measurement calculation method can be applied to various electrochemical measurement apparatuses 100 provided with two or more sensors of the same type, regardless of the type of the sensors.

In addition, various modifications and combinations of the embodiments can be made in a range without departing from the spirit of the present invention.

LIST OF REFERENCE CHARACTERS

100 . . . Electrochemical measurement apparatus
1 . . . Multi-sensor unit
2 . . . Information processing unit
11 . . . Substrate
123 . . . Electromagnetic sensor
1231 . . . Through hole
1232 . . . Measurement electrode
125 . . . Housing

The invention claimed is:

1. A multi-sensor unit comprising:
a substrate;
a plurality of sensors of a plurality of types of sensors attached to the substrate, the plurality of sensors including an electromagnetic sensor;
a through hole formed in the substrate;
an electrode attached to a surface of the substrate; and
a housing covering the through hole and the electrode,
wherein a sample solution supplied to a surface of the substrate opposite to the surface of the substrate having the electrode attached thereto is allowed to flow into the housing from the through hole and to be accommodated in the housing, so that the sample solution is allowed to be in contact with the electrode,
wherein the housing is configured to accommodate the sample solution within the housing so as to control a spread range of electric flux lines of the electrode, and electromagnetically separate the electrode from the plurality of sensors attached to the substrate.

2. An electrochemical measurement apparatus comprising:
the electromagnetic sensor according to claim 1; and
an information processing unit for receiving an output signal from the electromagnetic sensor and converting the received output signal to desired information to be outputted.

3. The electromagnetic sensor of claim 1, wherein the housing is formed of polyethylene terephthalate, polypropylene, and/or polyvinyl chloride.

4. The multi-sensor unit of claim 1, wherein the electromagnetic sensor and an ion selective electrode are attached to the substrate.

5. The multi-sensor unit of claim 4, wherein the ion selective electrode is an ISFET (ion-sensitive field-effect transistor) electrode.

6. The multi-sensor unit of claim 5, wherein the ion selective electrode is a first ion selective electrode, and wherein a second ion selective electrode is attached to the substrate.

7. The multi-sensor unit of claim 4, wherein the ion selective electrode is a first ion selective electrode, and wherein a second ion selective electrode is attached to the substrate.

8. The multi-sensor unit of claim 1, wherein the plurality of sensors attached to the substrate comprise at least one sensor of each of the plurality of types of sensors.

9. An electrochemical measurement apparatus comprising:
a multi-sensor unit comprising:
a substrate;
three or more sensors of one type of sensors attached to the substrate, the three or more sensors including an electromagnetic sensor;
a through hole formed in the substrate;
an electrode attached to a surface of the substrate; and
a housing covering the through hole and the electrode,
wherein a sample solution supplied to a surface of the substrate opposite to the surface of the substrate having the electrode attached thereto is allowed to flow into the housing from the through hole and to be accommodated in the housing, so that the sample solution is allowed to be in contact with the electrode,
a calculation part for calculating an average value of output values of the sensors; and
a calibration part for calibrating each of the output values of the sensors so as to be equal to the average value in the case where an absolute value difference between the average value calculated by the calculation part and each of the output values of the sensors exceeds a predetermined threshold value.

10. A method of calibrating a sensor using the multi-sensor unit according to claim 9 which is provided with three or more sensors of the same type comprising: in the case where an absolute value difference between an average value of output values of the plurality of sensors and an output value of each of the sensors exceeds a predetermined threshold value, automatically calibrating the output value of each of the sensors so as to be equal to the average value.

11. An electrochemical measurement method comprising:
using the multi-sensor unit according to claim 9 which is provided with a plurality of sensors of the same type; and
by performing a calculation based on output values of the plurality of sensors, removing a noise included in the output values.

12. An electrochemical measurement apparatus comprising:
a multi-sensor unit comprising:
a substrate;
three or more sensors of one type of sensors attached to the substrate, the three or more sensors including an electromagnetic sensor;
a through hole formed in the substrate;
an electrode attached to a surface of the substrate; and
a housing covering the through hole and the electrode,
wherein a sample solution supplied to a surface of the substrate opposite to the surface of the substrate having the electrode attached thereto is allowed to flow into the housing from the through hole and to be accommodated in the housing, so that the sample solution is allowed to be in contact with the electrode, and
a calculation part for, by performing a calculation based on output values of the plurality of sensors, calculating a measurement value excluding a noise included in the output values.

* * * * *